US010801770B2

(12) United States Patent
Broadbent

(10) Patent No.: US 10,801,770 B2
(45) Date of Patent: Oct. 13, 2020

(54) DISPENSING ICE BIN WITH SLIDING SLEEVE METERING DEVICE

(71) Applicant: MANITOWOC FOODSERVICE COMPANIES, LLC, New Port Richey, FL (US)

(72) Inventor: John Allen Broadbent, Trinity, FL (US)

(73) Assignee: MANITOWOC FOODSERVICE COMPANIES, LLC, New Port Richey, FL (US)

( * ) Notice: Subject to any disclaimer, the term of this patent is extended or adjusted under 35 U.S.C. 154(b) by 9 days.

(21) Appl. No.: 16/243,619

(22) Filed: Jan. 9, 2019

(65) Prior Publication Data

US 2019/0219319 A1    Jul. 18, 2019

Related U.S. Application Data

(60) Provisional application No. 62/617,704, filed on Jan. 16, 2018.

(51) Int. Cl.
*F25C 5/20* (2018.01)
*G01F 11/28* (2006.01)
*F25C 5/182* (2018.01)

(52) U.S. Cl.
CPC ............... *F25C 5/24* (2018.01); *F25C 5/182* (2013.01); *G01F 11/28* (2013.01); *F25C 2500/06* (2013.01); *F25C 2700/02* (2013.01)

(58) Field of Classification Search
CPC .... F25C 5/24; F25C 5/182; F25C 5/20; F25C 5/18; F25C 2500/06; F25C 2700/02; G01F 11/28
See application file for complete search history.

(56) References Cited

U.S. PATENT DOCUMENTS

| 3,608,786 | A | * | 9/1971 | Shelley | F25C 1/00 |
| | | | | | 222/232 |
| 3,715,119 | A | * | 2/1973 | Shelley | F25C 5/20 |
| | | | | | 222/241 |
| 4,226,269 | A | | 10/1980 | Carr et al. | |
| 4,946,073 | A | * | 8/1990 | Brill | B67D 1/08 |
| | | | | | 222/129.4 |
| 5,058,773 | A | | 10/1991 | Brill et al. | |
| 5,887,758 | A | | 3/1999 | Hawkes et al. | |
| 6,199,724 | B1 | | 3/2001 | Yeranossian | |

(Continued)

OTHER PUBLICATIONS

International Search Report dated Mar. 22, 2019 for PCT application No. PCT/US2019/012874.

(Continued)

*Primary Examiner* — Nicolas A Arnett
(74) *Attorney, Agent, or Firm* — Ohlandt, Greeley, Ruggiero and Perle, LLP

(57) ABSTRACT

An ice storage bin with sliding sleeve metering device for filling buckets, totes or other ice containers. The metering device allows the containers to be filled from the ice storage bin with the exact volume of ice desired during each dispense. The metering device won't spill ice or water, is easily operated and prevents the ice container from being removed prematurely. The metering device can be operated either manually or automatically. The bucket or container is optionally a liner disposed in a bucket with a false bottom.

25 Claims, 12 Drawing Sheets

(56) References Cited

U.S. PATENT DOCUMENTS

| | | | | |
|---|---|---|---|---|
| 6,607,096 B2* | 8/2003 | Glass | ............... | F25C 5/24 |
| | | | | 222/1 |
| 7,263,844 B2* | 9/2007 | Brunner | ............... | F25C 1/147 |
| | | | | 62/78 |
| 7,421,834 B1* | 9/2008 | Doolan | ............... | B65B 1/366 |
| | | | | 53/570 |
| 7,870,974 B2* | 1/2011 | Miller | ............... | F25C 5/182 |
| | | | | 222/108 |
| 8,833,406 B2* | 9/2014 | Berge | ............... | F25C 5/20 |
| | | | | 141/82 |
| 2014/0137984 A1 | 5/2014 | Broadbent | | |

OTHER PUBLICATIONS

Written Opinion dated Mar. 22, 2019 for PCT application No. PCT/US2019/012874.

* cited by examiner

DISPENSING ICE BIN WITH SLIDING SLEEVE METERING DEVICE

CROSS-REFERENCED APPLICATION

This application claims priority to US Provisional Patent Application No. 62/617,704, filed on Jan. 16, 2018, which is incorporated herein in its entirety by reference thereto.

BACKGROUND OF THE DISCLOSURE

1. Field of the Disclosure

The present disclosure relates to an ice storage bin having a unique integral sliding sleeve metering device which either manually or automatically dispenses a metered quantity of ice from an ice storage bin.

2. Discussion of the Background Art

Conventional ice storage bins are designed to allow ice to be scooped out of them. Invariably the ice is scooped into buckets, however the bins are not designed for filling buckets. Rather they are designed to store the ice efficiently (with good seals and insulation) and to facilitate scooping out ice in the conventional way with a hand-held scooper device. Conventional ice scooping is slow, involves repeatedly bending over, reaching into the ice bin, lifting out the ice and dropping ice into a bucket. It may also involve contaminating the ice with your hands, spilling ice and/or water onto the floor (i.e. creating a mess or a slip hazard), and occasionally having the door of the ice bin fall on your head.

Alternatively, rotating or guillotine-type closures disclosed in U.S. Pat. No. 5,887,758 to Hawkes et al. can overfill the container and can cause ice to be directed outside of the container, resulting in spilled ice.

The objective of this disclosure is to provide a low-cost system for quickly and accurately filling an ice bucket or other container with ice directly from the ice storage bin with minimal effort, virtually no human contact with the ice, thereby preventing contamination, and with no spills of ice or water onto the floor.

The present disclosure also provides many additional advantages, which shall become apparent as described below.

SUMMARY

An ice storage bin comprising: an ice storage compartment; an ice metering sleeve movably disposed within the ice storage compartment, the ice metering sleeve having a top opening and a bottom opening, thereby allowing ice to pass through the ice metering sleeve from the top opening to the bottom opening; a discharge port disposed about a bottom portion of the ice storage compartment through which the ice metering sleeve can pass through the discharge port when in an open position; and an ice collection container for receiving ice from the ice storage compartment via the bottom opening of the ice metering sleeve when the ice metering sleeve is in the open position.

The ice storage bin further comprising a sealing device or isolating device which prevents ice from entering the ice metering sleeve via the top opening when the ice metering sleeve is in a closed position.

The ice storage bin further comprising a handle for moving the ice metering sleeve between the closed and open positions. Preferably, a pair of oppositely disposed slide devices which provide for reciprocal vertical movement of the ice metering sleeve via the handle between the closed and open positions.

The ice metering sleeve comprises an elongated body member disposed between the top opening and the bottom opening, and a drip catcher device disposed about the bottom opening. The drip catcher device is formed proximate to the bottom opening of the ice metering sleeve. The drip catcher device comprises an exterior channel and an interior channel formed on the elongated body member near the bottom opening of ice metering sleeve.

The ice storage bin further comprises a curved surface formed on the elongated body member and adjacent to the interior channel, the curved surface is angled toward the exterior channel away from an interior surface of the elongated body member, thereby allowing condensation from the elongated body member to traverse the interior surface of the elongated body member into the interior channel while keeping ice cubes out of the interior channel.

The ice storage bin further comprises a drain port in fluid communication with the exterior and interior channels, whereby condensate collected by the exterior and interior channels exits the ice storage bin via the drain port.

The ice metering sleeve is formed of double-wall construction with an insulation layer disposed within the double-wall, wherein the insulation layer is at least on selected from the group consisting of: gas, air and foam.

The ice storage bin further comprises a catch mechanism which holds the ice metering sleeve in the closed position, wherein the catch mechanism is a spring-loaded, ball-nose detent. The ice storage bin further comprises a locking mechanism which holds the ice metering sleeve in the closed position when the ice collection container is not disposed in communication with the discharge port. The locking mechanism is spring-loaded to enable it to move in locking position when the ice collection container is not disposed in communication with the discharge port and unlocking position when the ice collection container is disposed in communication with the discharge port to receive ice from the ice metering sleeve.

The ice collection container is a bucket or a liner disposed in a bucket with a false bottom.

A method for discharging a metered amount of ice from an ice storage bin, the method comprising: actuating an ice metering sleeve which is movably disposed within an ice storage compartment, wherein the ice metering sleeve is moved between a closed position and an open position, the ice metering sleeve having a top opening and a bottom opening, such that the ice, which is disposed within the ice storage compartment, traverses the ice metering sleeve from the top opening to the bottom opening; discharging a metered amount of ice from the bottom opening of the ice metering sleeve via a discharge port disposed proximate to a bottom portion of the ice storage compartment; and collecting the discharged ice in an ice collection container. The ice metering occurs because the finite size of the ice collection container causes the ice flowing through the ice metering sleeve to stop once the level of ice in the ice collection container has risen to touch the bottom of the ice metering sleeve. At this point the ice in the ice collection container blocks any additional ice from leaving the ice metering sleeve and entering the ice collection container. Thus, a known first amount of ice has entered the ice collection container. Lifting the ice metering sleeve out of the ice collection container at this point causes the ice remaining in the ice metering sleeve to fall into the ice collection container. Thus, a second known quantity of ice (i.e. corresponding to the amount of ice the ice metering sleeve can hold) then drops into the ice collection container. It is this first and second known quantities of ice which added together becomes the metered amount of ice which drops into the ice collection container.

The actuating of the ice metering sleeve is provided by either (1) a handle and a pair of oppositely disposed slide devices or (2) motor, whereby the metering sleeve moves in reciprocal vertical movement between the closed and open positions. Preferably ice metering sleeve comprises an elongated body member disposed between the top opening and the bottom opening, wherein the elongated body member can have a square, triangular, oval, round or any other cross-section.

The method further comprises a drip catcher device which is formed proximate to the bottom opening of the ice metering sleeve, wherein the drip catcher device comprises an exterior channel and an interior channel.

The method further comprises a curved surface formed on the elongated body member and adjacent to the interior channel, the curved surface is angled toward the exterior channel away from an interior surface of the elongated body member, thereby allowing condensation from the elongated body member to traverse the interior surface of the elongated body member into the interior channel while keeping ice cubes out of the interior channel.

The method further comprises a drain port in fluid communication with the exterior and interior channels, whereby condensate collected by the exterior and interior channels exits the ice storage bin via the drain port.

The method further comprises the steps of: returning the ice metering sleeve to a closed position after the discharging step; and catching the ice metering sleeve so that it does not return to the opened position.

The method further comprises the step of locking the ice metering sleeve when in the closed position so that it does not return to the opened position when the ice collection container has been removed from the ice storage bin after the discharge step.

Further objects, features and advantages of the present disclosure will be understood by reference to the following drawings and detailed description.

DETAILED DESCRIPTION OF THE PREFERRED EMBODIMENT

The heart of the system is a sliding sleeve "valve" which when raised closes the bin and blocks the flow of ice. When the sleeve valve is lowered, it allows the ice to flow out of the bin and into the container until the ice level in the container reaches the bottom of the sleeve. When the ice reaches that level, the ice cannot continue flowing through the sleeve. This results in the container being filled to the same level every time. When the sleeve is then raised to close the valve, the ice remaining inside the sleeve falls into the container, topping off the container by a known, consistent amount. By designing the target container (e.g., bucket) and the sleeve valve properly, it is possible to perfectly fill the container with ice every time.

The use of a sliding sleeve valve for ice metering provides several new and unexpected benefits:

The effect described above, that is, that the target container will only fill to the level of the bottom of the sleeve and then gets "topped off" by the volume of ice inside the sleeve, providing a very predictable and consistent fill of the container every dispense—never underfilling or overfilling the container. This dispense accuracy and consistency does not require any sensors, feedback or motors to be accomplished. Rather, it reliably occurs every time because of gravity, physics and the geometry of the sleeve and the ice.

The sliding sleeve mechanism does not cause any ice to fall or slide anywhere except into the target container below.

Opening the sleeve valve by dropping it downward can be accomplished with almost no force since the sleeve is just sliding down along the surface of the ice. When raising the sleeve, it passes through ice which has just fallen into place. Because of this, the ice is loose and offers little resistance to the upward motion of the sleeve. Finally, by locating the point of closure above where the ice is resting, the sleeve does not need to slice or crush any cubes to close off against the closure point—since there is no ice there. Because of these factors, both the opening and closing movements of the sleeve are accomplished with very little force, so they can be done by hand with little effort.

Because the sleeve physically drops inside the target container (e.g., bucket) while filling it, the sleeve prevents the bucket from being removed until the sleeve has been raised back into its closed position. The sleeve is essentially "in the way", preventing removal of the bucket. This prevents the bucket from being removed prematurely and prevents the spill that could result if that happened.

Figure 1:
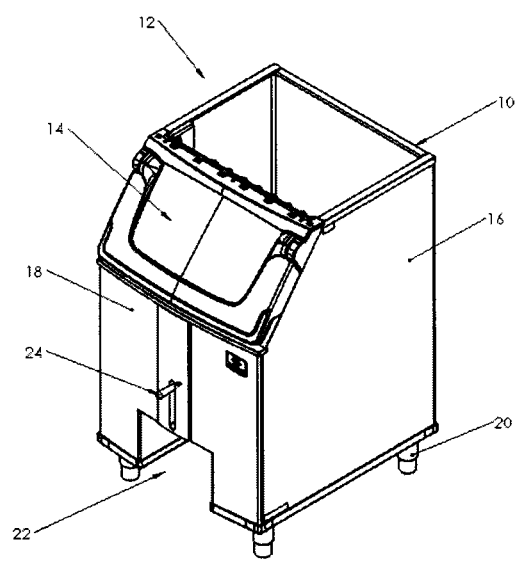
FIG. 1 is an isometric view of ice storage bin incorporating sliding sleeve metering device.

FIG. 1 shows an isometric view of an ice storage bin incorporating the sliding sleeve metering device. The bin 10 consists of a large, four-sided container with an opening 12 on top. Opening 12 is where an ice machine would sit. Ice from the ice machine is delivered into the bin 10 through opening 12. The bin 10 consists of the usual parts, i.e. a door 14, four insulated side walls (i.e. right wall 16, left wall, back wall and front wall 18), a bottom wall and legs 20. The exterior of the dispensing bin also includes an indent 22 in the front wall where a bucket or other container would be located when ice is dispensed into it, and a handle 24 which is used to actuate the sliding sleeve metering device.

Figure 2:
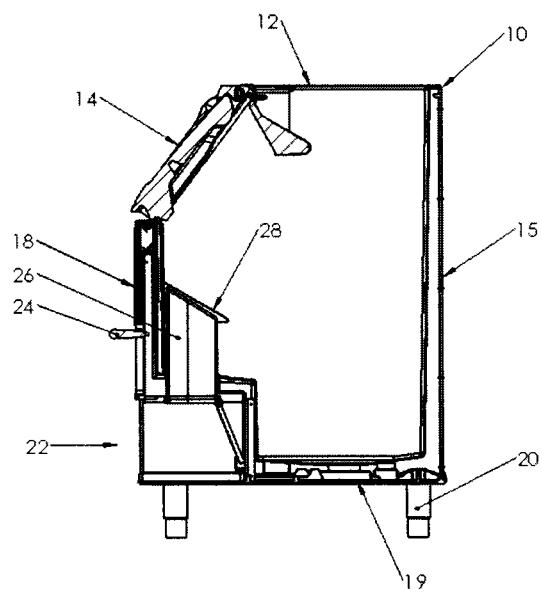
FIG. 2 is aside cross-sectional view of bin with sleeve in the closed (raised) position.

FIG. 2 is a side cross-section of bin 10 showing top opening 12, door 14, back wall 15, front wall 18, bottom wall 19 and legs 20. The dispensing/metering system includes an indent 22 (which provides an area to locate the target bucket or container), sleeve 26, sleeve handle 24 and sealing wall 28.

Figure 3:
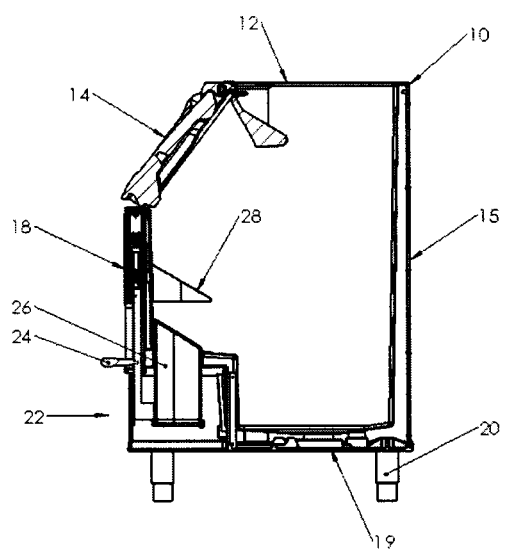
FIG. 3 is a side cross-sectional view of bin with sleeve in the open (lowered) position.
Figure 4:
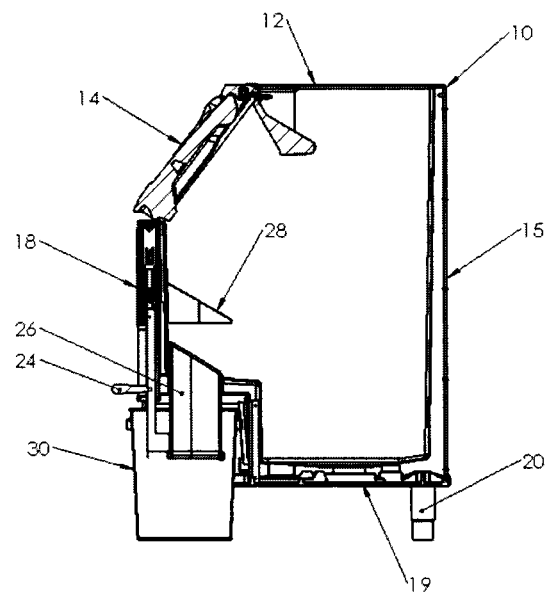
FIG. 4 is a side cross-sectional view of bin with sleeve in the open position showing a bucket for receiving the ice.

FIG. 3 shows the same view of bin 10 but with sleeve 26 in the lowered/open position. FIG. 4 shows the same view with the sleeve in the lowered/open position and with a bucket 30 shown located within indent 22.

With the sleeve 26 closed, as shown in FIG. 2, the top of sleeve 26 is seated against sealing wall 28. This configuration completely closes the bottom of bin 10 so that no ice can fall out.

Figure 5:
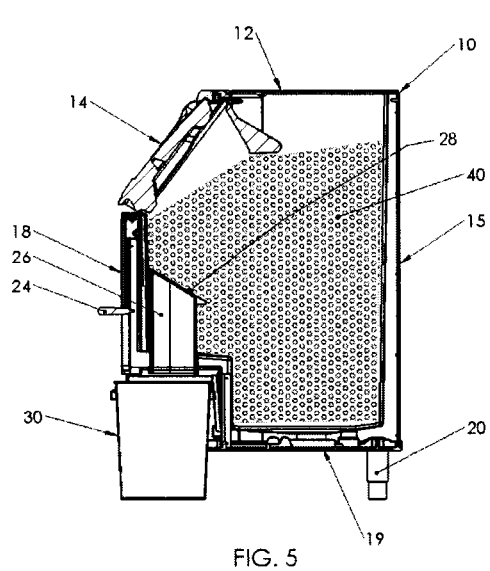
FIG. 5 is a side cross-sectional view of bin with sleeve in the closed (raised) position and the bin full of ice.

FIG. 5 shows the configuration of FIG. 3, but with bin 10 full of ice 40. As can be seen in this view, the ice 40 is held inside the bin by the presence of raised sleeve 26 closed against sealing wall or cap 28.

Figure 6:
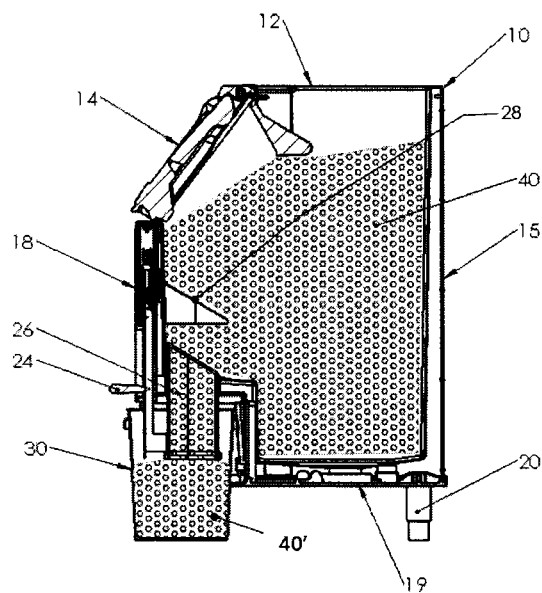
FIG. 6 is a side cross-sectional view of bin with sleeve in the open (lowered) position, the bin full of ice and with ice having partially dispensed into a bucket.

By pushing down on handle 24, sleeve 26 is lowered as shown in FIG. 6. Moving sleeve 26 down creates a flow path for the ice 40 going from the interior of bin 10, through the space created above sleeve 26 and below sealing wall 28, through sleeve 26 and into bucket 30. This flow path allows ice to flow from bin 10 into bucket 30 until the level of ice in bucket 30 rises to the bottom of sleeve 26. At this point the flow of ice will stop since there is no longer a place into which the ice 40 can flow. At this point the bucket 30 is not completely full, but rather roughly two-thirds full, and sleeve 26 is full of ice 40'.

Figure 7:
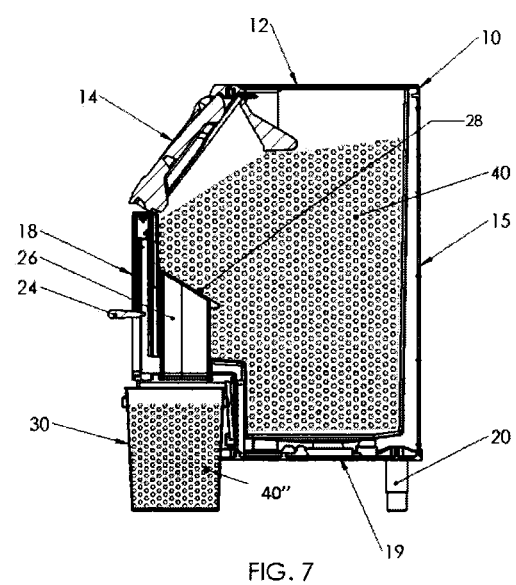
FIG. 7 is a side cross-sectional view of bin with sleeve in the closed (raised) position, with the bin full of ice, having just fully dispensed ice into a bucket.

When the user then lifts handle 24 to its up-most position, as shown in FIG. 7, sleeve 26 again seals off against sealing wall or cap 28 closing off the flow path for the ice. Simultaneously, the ice that was left inside sleeve 26 drops into bucket 30, "topping-off" the ice in bucket 30, filling bucket 30 to the full level with ice 40". At this point, bin 10 is again closed as was the case in FIGS. 2 and 5.

Because the ice completely fills-in above sleeve 26 when the operator drops it to fill bucket 30 to the first level, and because the ice does not move that fast, when you lift sleeve 26 you essentially just cut through the pile of ice above sleeve 26 before it has a chance to move, and that ice is what dispenses into bucket 30.

Dispensing bin 10 includes features to optimize its operation, specifically:

Sleeve 26 is insulated to minimize ice melt and condensation.

Drip-catching grooves 46 and 47 located at the base of sleeve 26 catches any water drips resulting from ice melt or condensation that fall down the inside or outside of sleeve 26.

A path or conduit 52 for water collected by the drip-catching grooves 46 and 47 to the drain 56 so that water collected is properly drained.

A catch mechanism 62 for holding sleeve 26 in the raised position when sleeve 26 is lifted by the user. Because sleeve 26 falls with no effort, a catch mechanism 62 is needed to hold sleeve 26 in the raised position. Without it, sleeve 26 will always fall to the lowered position. The catch mechanism 62 must latch the sleeve 26 in the raised position whether or not a bucket is placed under sleeve 26. It must be possible for the user to overcome the catch mechanism in order to drop sleeve 26 to dispense ice into a bucket.

A locking mechanism 52 for holding sleeve 26 in the raised position unless a bucket 30 is located underneath sleeve 26. This is needed to prevent sleeve 26 from accidentally dropping or being dropped when a bucket is not present, causing an accidental ice spill. Such a spill can be very significant, with 6 or more buckets-worth of ice being dispensed instantly onto the floor. The catch mechanism 62 will hold the sleeve up, but it will not prevent a person from lowering the sleeve. Likewise, if the locking mechanism 52 were used without the catch mechanism 62, the sleeve would drop instantly whenever a bucket was placed into slot 22. This is not desirable since a user may want to keep a bucket 30 in slot 22 for storage of the bucket 30 without dispensing ice into it.

Drawer slides 60 are used to provide the necessary vertical motion needed for sleeve 26. Drawer slides 60 provide a smooth linear slide mechanism for the sleeve 26 and allow the entire sleeve mechanism to be easily removed using the drawer slide's normal release mechanism.

Bucket with false bottoms. Not all ice bin users want their buckets filled to the same level. Some users want their buckets filled less full so that the buckets will be lighter and easier to carry. This can be accomplished by providing buckets with false bottoms. The false bottom has the effect of replacing a known amount of ice with an empty space, thereby making the bucket lighter and easier to carry.

A bag-filling apparatus. The dispensing bin of the current disclosure is ideally suited to quickly filling a container. The present disclosure includes an apparatus to convert the bin so that it can fill plastic bags instead of buckets.

Figure 8:
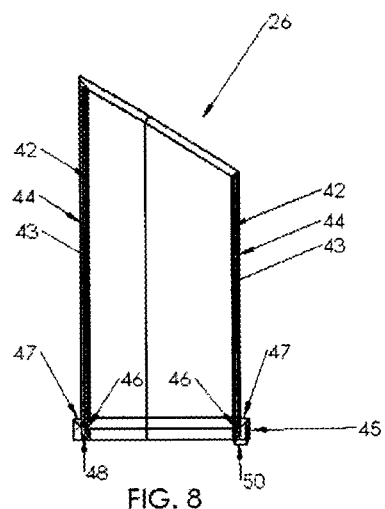
FIG. 8 is a side cross-sectional view of bin sleeve showing double-wall construction and drip-catching feature.

FIG. 8 shows a cross-section of sleeve 26 illustrating the double-wall construction it uses to thermally insulate sleeve 26 and minimize the condensation and melting it can create. When in use, sleeve 26 sits inside ice bin 12 surrounded by ice 40 as shown in FIG. 5. Because the outside wall 44 of sleeve 26 is in contact with so much ice 40, it can get very cold on that side. The inside of sleeve 26 is open to the ambient environment since it is open at its bottom. This means that the inside wall 42 of sleeve 26 is potentially exposed to warm, moist air from outside the bin. This can cause two problems: (1) if the inside wall 42 is cold enough, the moisture from the outside air will condense on that inside wall 42 and create water drips from condensation; and (2) if the warmth from the air adjacent to the inside wall 42 provides enough warmth, some of the ice 40 adjacent to the outside wall 44 will melt, causing water drips on the outside wall 44.

To minimize both problems, the sleeve 26 is blow-molded using double-wall construction such that there is an insulating layer 43, e.g., gas, air, foam, etc., between the outside wall 44 and the inside wall 42. This double-wall construction reduces the heat transfer between the inside and outside walls, thus minimizing both condensation and melting. Providing a layer of insulation between the inside wall 42 and outside wall 44 can be accomplished in other ways as well, for example by attaching a layer of insulation to either or both the inside wall 42 and outside wall 44.

Even with this insulated, double-wall construction, condensation and melting can occur on sleeve 26. To deal with the drips of water that may result from that, a special drip catching geometry is provided at the base of sleeve 26. This is shown in FIG. 8. An injection molded drip catching device 45 is attached to sleeve 26 at its base. This drip catching device 45 has a groove 48 on the inside surface of sleeve 26 and a groove 47 on the outside surface of sleeve 26. A curved surface 46 is located at the base of sleeve 26. Drips of water from ice melt falling down the outside wall 44 of the sleeve fall into groove 47. Drips of water from condensation falling down the inside wall 42 follow curve 46 into groove 48. Curve 46 channels water into groove 48 while keeping ice cubes, which fall through sleeve 26 when ice is being dispensed, out of groove 48. Groove 47 and groove 48 combine into a single groove above drip exit 50. Drips from both condensation and from ice melt are directed to exit 50 where they leave sleeve 26.

Alternatives to the double-wall construction having an insulation layer disposed within the double wall of sleeve 26, include (1) adding a layer of insulating material to either or both the inside and outside walls of ice metering sleeve 26, or (2) fabricating an ice metering sleeve 26 from a sufficiently low thermal conductive material, as necessary to prevent condensation or melting.

Figure 9:
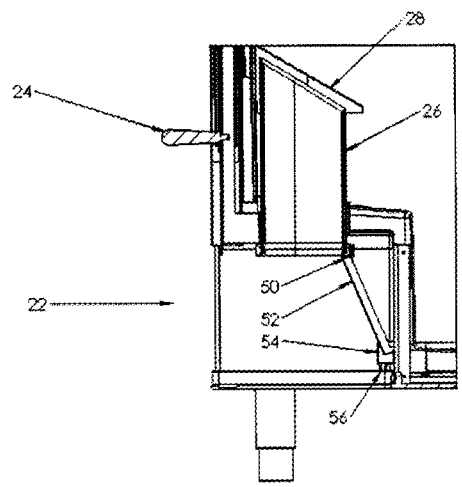
FIG. 9 is a side cross-sectional view of the dispense area of the bin showing the water path/sleeve support when no bucket is present.

FIG. 9 is a side cross-sectional view of the dispense area of bin 10 showing the dispense area 22, sleeve 26 and sealing wall 28. FIG. 9 shows the water path/sleeve support 52 used to direct water from sleeve 26 from opening 50, down water path 52, into water reservoir 54, out through nipple 56 into a drain line to a drain (not shown). Thus, water path/sleeve support 52 provides a path to remove condensation and melt water from sleeve 26 and move it to a drain. Water path/sleeve support 52 also acts as a locking mechanism 52 or "kickstand" which holds sleeve 26 in the raised, closed position if a bucket is not present to dispense into. This prevents the sleeve 26 from dropping when a bucket is not present which could result in a significant, accidental dispense of ice onto the floor. Water path/sleeve support 52 prevents sleeve 26 from dropping when there is no bucket 30 present even if a user pushes down on handle 24.

Figure 10:
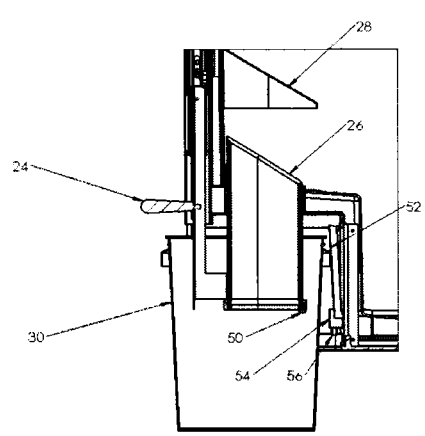
FIG. 10 is a side cross-sectional view of the dispense area of the bin showing the water path/sleeve support when a bucket is present.

When a bucket 30 is present and pushed into position in indent or slot 22, as shown in FIG. 10, the bucket 30 pushes the water path/sleeve support or locking mechanism 52 (the kickstand) out of the way so that the sleeve can drop into bucket 30. This makes it possible for sleeve 26 to drop into bucket 30 to dispense ice, but only when a bucket 30 is present. Because water path/sleeve support 52 is no longer underneath the sleeve 26 or outlet 50 at this point, water coming out of exit 50 will fall into bucket 30 along with ice. Ideally water path/sleeve support 52 is spring-loaded or has some other return means so that when sleeve 26 is raised and bucket 30 is removed, water path/sleeve support 52 will fall back into place underneath sleeve 26.

Figure 11:
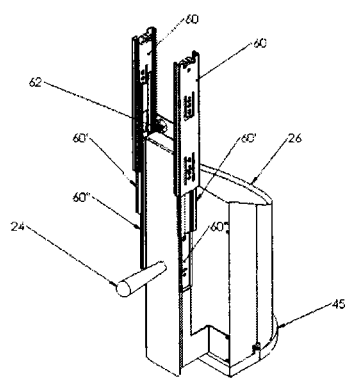
FIG. 11 is an isometric view of sliding sleeve assembly illustrating drawer slides and spring loaded, ball-nose detent.
Figure 20:
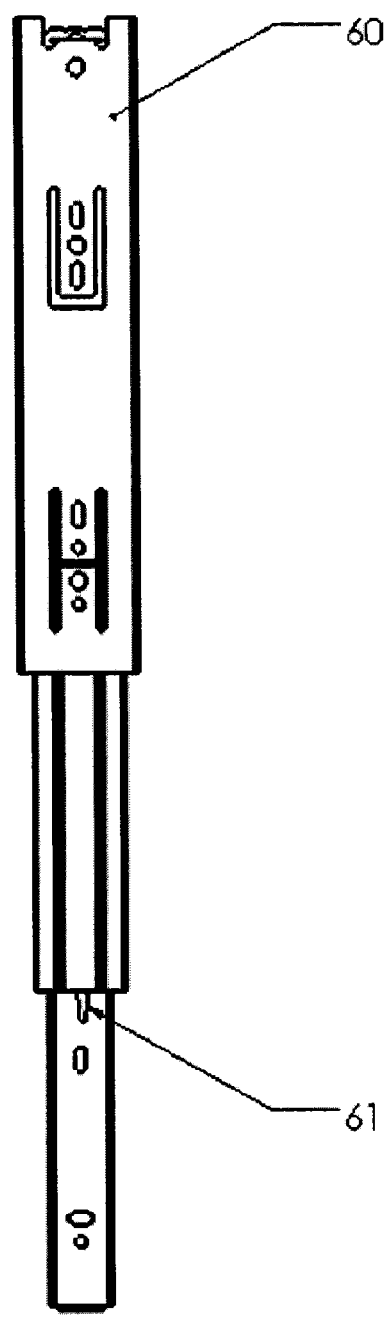
FIG. 20 is a front view of a conventional drawer slide as utilized in the present disclosure.

FIG. 11 is an isometric view of the sliding sleeve assembly consisting of the sleeve 26, the drip catching device 45, handle 24 and drawer slides 60. Also shown in FIG. 11 is a ball nose spring detent device, i.e. a catch mechanism 62. Bin 10 utilizes drawer slides 60 to provide economical, smooth, rugged, guided sliding of sleeve 26. Typical drawer slides 60, as shown in FIG. 20, often include a release lever 61 so that—in their usual use—allow easy removal of the drawer. You press the release lever 61 on each slide simultaneously, and the drawer can be pulled out of the slides. In this use, the release lever 61 allows the removal of the entire sleeve 26 from the bin without tools. Removal of food contact parts without tools is a requirement of NSF for ice bins.

When sitting in a bin full of ice, sleeve 26 can be lowered with almost no downward force. This is because the only force preventing sleeve 26 from falling is the very small amount of friction between the ice 40 and the outer surface 44 of sleeve 26. This is good in that it is very easy to lower the sleeve. This is bad in that sleeve 26 will not stay up when you raise it—the weight of sleeve 26 is typically enough to cause it to fall down through the ice. To overcome this problem, a device is needed to hold the sleeve 26 in the raised position, e.g., the catch mechanism 62 mentioned above. In the present disclosure catch mechanism 62 is a commercially available ball nose spring detent device, such as is available from McMaster-Carr. Likewise, sleeve 26 could be held in the raised position with other types of latching mechanisms (e.g. a magnet).

Figure 18:
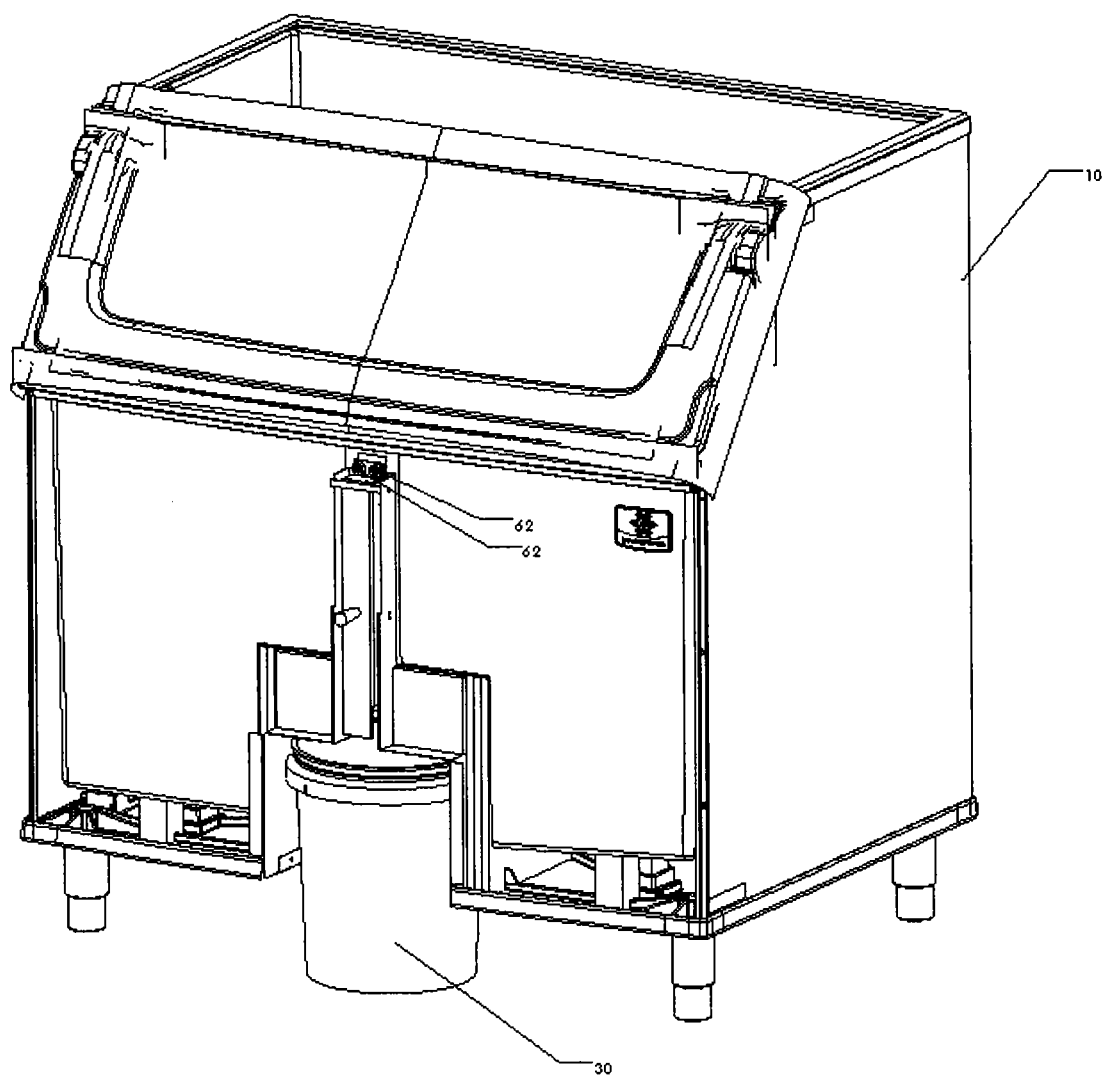
FIG. 18 is a front, right side perspective view of an ice storage bin incorporating sliding sleeve metering device according to an embodiment of the present disclosure, with the front sheet metal of the bin removed to better illustrate the metering device.
Figure 19:
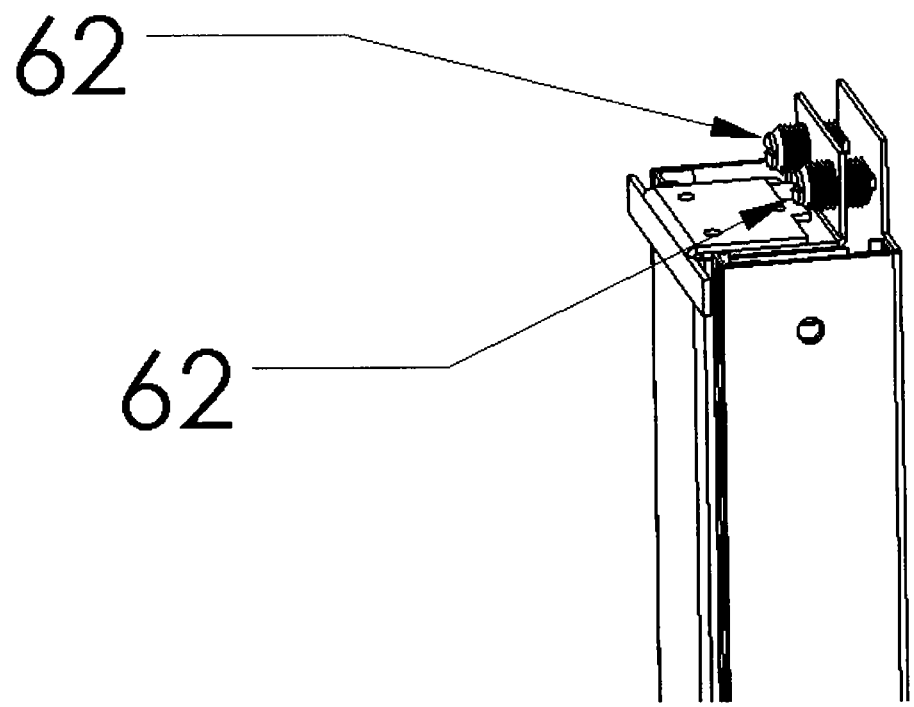
FIG. 19 is a side view of the spring-loaded ball detent devices which have a spring that forces a ball bearing into a hole as it slides past the hole in order to latch the sliding sleeve assembly in the closed position when it is raised.

Spring loaded detents 62 are preferably used to hold the sleeve up prior to the bucket 30 being removed. FIG. 18 is a front, right side perspective view of an ice storage bin incorporating sliding sleeve metering device according to an embodiment of the present disclosure. FIG. 19 is close-up isometric view a typical commercially available spring-loaded ball detent mechanism 62. Such devices, available from McMaster-Carr for example, operate by forcing a stainless-steel ball bearing into a hole in order to create a "detent" effect. FIG. 20 shows an example of a conventional release lever 61 of a drawer slide 60 as utilized in the present disclosure.

Not all ice bin users want their buckets filled with the same amount of ice. Some users want their buckets filled less full so that the buckets will be lighter and easier to carry. This can be accomplished with a liner installed inside the bucket to create a false bottom. This false bottom bucket is illustrated in FIG. 12 and FIG. 13.

Figure 12:
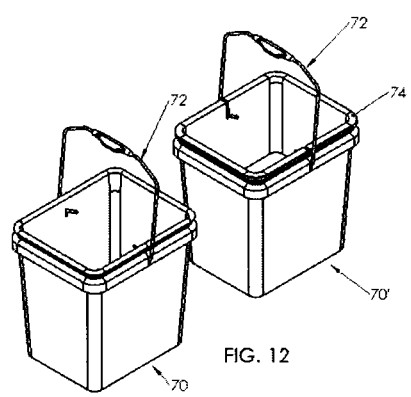
FIG. 12 is an isometric view of two buckets, one empty and the other containing a liner to create a false bottom.
Figure 13:
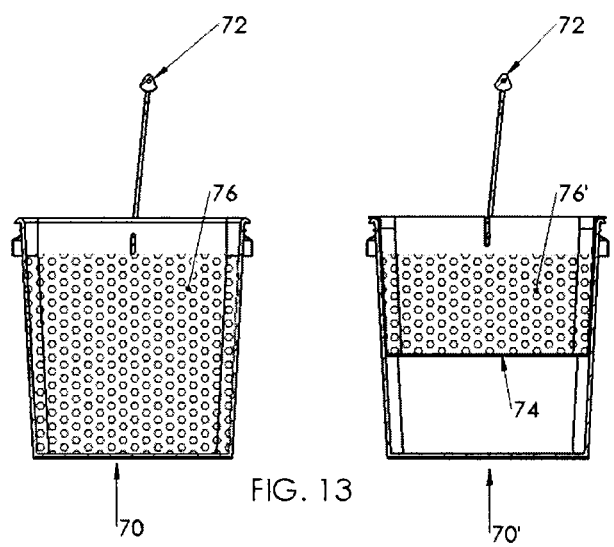
FIG. 13 is a cross-sectional view of the two buckets, one configured normally and the other containing a liner to create a false bottom, both buckets containing ice.

FIG. 12 shows an isometric view of two buckets, a standard bucket 70 and a second bucket 70'. Both buckets have handles 72. The second bucket 70' is different from the first bucket 70 in that bucket 70' contains a liner 74 to create a false bottom. FIG. 13 shows a cross-sectional view of the two buckets illustrating the standard bucket 70 and the bucket 70' containing the liner 74. Buckets 70 and 70' are filled with ice 76 and 76', respectively.

The geometry of the ice dispense mechanism causes the bucket fill level to always be the same. However, by creating a false bottom in bucket 70' using liner 74, the fill amount is significantly less in bucket 70'. Thus, a smaller fill amount can be easily achieved with the same dispense mechanism simply by installing a liner 74 in the bucket 70. This causes the bucket to be filled to the same upper level, but as can be seen in FIG. 13, with substantially less ice.

The dispensing bin of the present disclosure dispenses ice to fill a bucket to a predetermined height. However, if the bottom of the bucket is at a height above where that bottom is normally located, less ice will be needed to fill the bucket, and thus less ice will be dispensed by the dispensing bin mechanism. So by having a false bottom inside the bucket it is possible to fill the bucket with a reduced quantity, or weight, of ice. This accomplishes the goal of allowing some customers to fill their buckets with less ice.

Ice from bins is often used to fill plastic bags which can then be sold to customers in a retail environment (e.g., convenience stores, liquor stores, etc.). Filling the bags can be a significant, labor-intensive chore. The present invention can be configured in a way to more easily fill plastic bags with ice, rather than buckets, reducing the difficulty of bagging ice. The device needed to do this is basically a bracket for holding a wicket of plastic bags which can be used to hold one bag at a time in an open position. The open bag held by the bracket is then moved underneath the dispensing sleeve so that the sleeve can extend into the bag rather than into a bucket. When the sleeve is then lowered, the plastic bag is filled with ice. Once the bag is filled, the sleeve is raised and the bracket is moved out from underneath the bin so that the filled bag can be tied-shut and removed.

Figure 14:
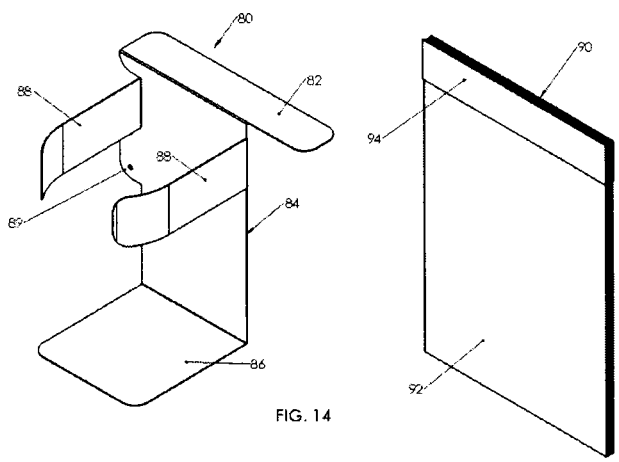
FIG. 14 is an isometric view of the bag holder and separate wicket of plastic bags.

Such a device is shown in FIG. 14 through FIG. 16. FIG. 14 shows the bracket 80 used to hold a wicket of plastic bags 90. The bagger bracket 80 consists of a sheet metal part with a wicket support 82, back section 84, bottom section 86 and bag-holding arms 88. The bracket also has a zone 89 configured to be attached to a hinge (not shown). The wicket of plastic bags 90 consists of a stack of bags 92 which are held at their tops by a wicket binder 94.

Figure 15A:
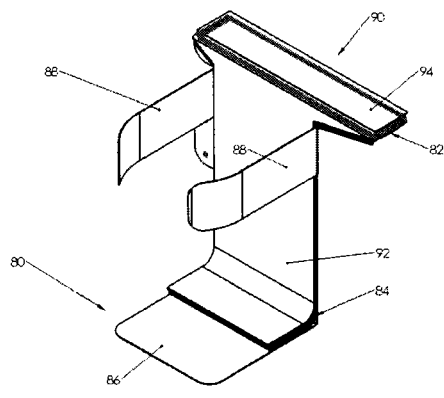
FIG. 15a is an isometric view of the bag holder with wicket of plastic bags attached.
Figure 15B:
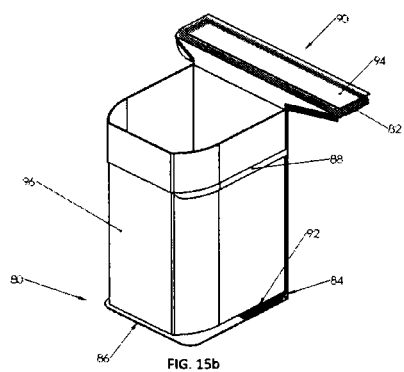
FIG. 15b is an isometric view of the bag holder with wicket of plastic bags attached and one plastic bag pulled forward.

For use, as shown in FIG. 15*a*, the wicket of bags 90 is attached to the bagger bracket 80 such that the binder 94 is attached to the wicket support 82. The bags 92 drape down along bracket back section 86 and bottom section 86. FIG. 15*b* shows a plastic bag 96 pulled from the wicket of bags and draped over the bag-holding arms 88 to hold the bag open.

Figures 16A, 16B:
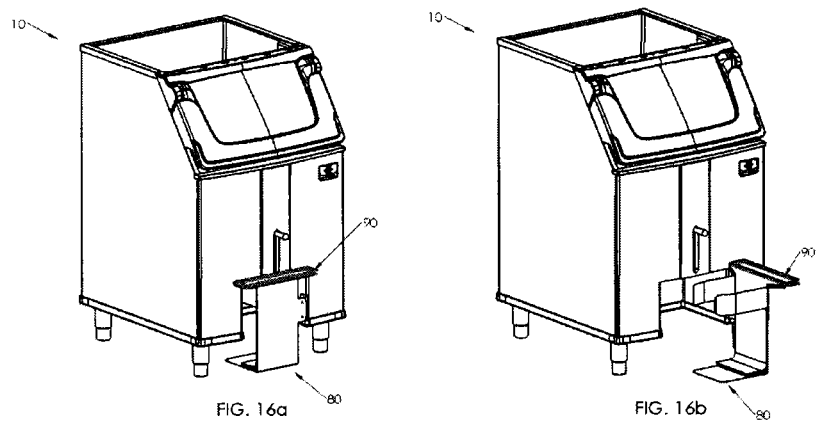
FIG. 16a is an isometric view of dispensing bin with bag holder attached in closed position.
FIG. 16b is an isometric view of dispensing bin with bag holder attached in open position.

The bagger bracket in this configuration is then swung, using a hinge, underneath bin 10 and into indent 22 as shown in FIG. 16*a*. This places the open bag 96 directly underneath sleeve 26 so that the sleeve can be dropped into bag 96 to fill it with ice. After the bag has been filled and sleeve 26 raised back to its closed position, the bagger bracket 80 can be swung open, as shown in FIG. 16*b*, so that the bag of ice can be tied-shut and removed.

Figure 17:
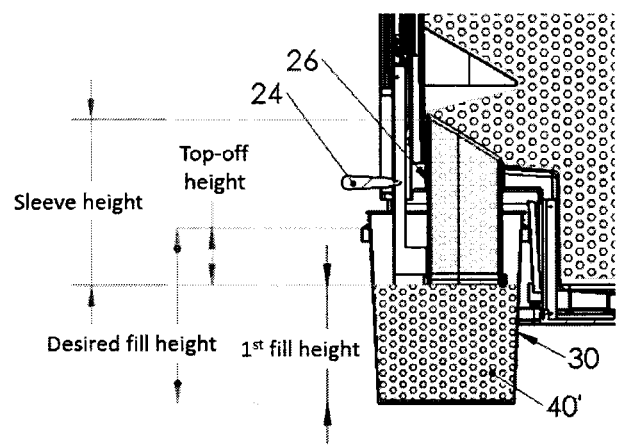
FIG. 17 is a side cross-sectional view of bin with sleeve in the open (lowered) position, the bin full of ice and with ice having partially dispensed into a bucket illustrating dimensions needed for fill calculations.

It is important to design the bin and the dispensing system so that it delivers the desired amount of ice. Sizing the sleeve and determining its location, both in its raised and lowered positions, can be calculated as provided below. Assuming the desired fill height (as shown in FIG. 17), the bucket diameter and the sleeve diameter and height are all known, the 1st fill height can be determined with the formulas below. (Note that this 1$^{st}$ fill height corresponds to the lowest position for the sleeve 26):

$$\begin{aligned} 1st \text{ fill height} &= \text{Desired fill height} - \text{top off height} \\ &= \text{Desired fill height} - \frac{\text{Sleeve Volume}}{\text{Bucket Area}} \\ &= \text{Desired fill height} - \frac{\frac{\pi * \text{Sleeve } ID^2 * \text{Sleeve height}}{4}}{\frac{\pi * \text{Bucket } ID^2}{4}} \\ &= \text{Desired fill height} - \frac{\text{Sleeve } ID^2 * \text{Sleeve height}}{\text{Bucket } ID^2} \end{aligned}$$

While I have shown and described several embodiments in accordance with my disclosure, it is to be clearly understood that the same may be susceptible to numerous changes apparent to one skilled in the art. Therefore, I do not wish to be to limited to the details shown and described but intend to show all changes and modifications that come within the scope of the appended claims.

What is claimed is:

1. An ice storage bin comprising: an ice storage compartment; an ice metering sleeve movably disposed within said ice storage compartment, said ice metering sleeve having a top opening and a bottom opening, thereby allowing ice to pass through said ice metering sleeve from the top opening to the bottom opening; a discharge port disposed about a bottom portion of said ice storage compartment through which said ice metering sleeve can pass through said discharge port when in an open position; and an ice collection container for receiving ice from said ice storage compartment via said bottom opening of said ice metering sleeve when said ice metering sleeve is in the open position.

2. The ice storage bin according to claim 1, further comprising a sealing device or isolating device which prevents ice from entering said ice metering sleeve via said top opening when said ice metering sleeve is in a closed position.

3. The ice storage bin according to claim 2, further comprising a handle for moving said ice metering sleeve between said closed and open positions.

4. The ice storage bin according to claim 3, further comprising a pair of oppositely disposed slide devices which provide for reciprocal vertical movement of said ice metering sleeve via said handle between the closed and open positions.

5. The ice storage bin according to claim 2, further comprising a catch mechanism which holds said ice metering sleeve in the closed position.

6. The ice storage bin according to claim 5, wherein said catch mechanism is a spring-loaded, ball-nose detent.

7. The ice storage bin according to claim 2, further comprising a locking mechanism which holds said ice metering sleeve in the closed position when said ice collection container is not disposed in communication with said discharge port.

8. The ice storage bin according to claim 7, wherein said locking mechanism is spring-loaded to enable it to move in locking position when said ice collection container is not disposed in communication with said discharge port and unlocking position when said ice collection container is disposed in communication with said discharge port to receive ice from said ice metering sleeve.

9. The ice storage bin according to claim 1, wherein said ice metering sleeve comprises an elongated body member disposed between said top opening and said bottom opening.

10. The ice storage bin according to claim 9, further comprising a drip catcher device formed proximate to said bottom opening of said ice metering sleeve.

11. The ice storage bin according to claim 10, wherein said drip catcher device comprises an exterior channel and an interior channel formed on said elongated body member near said bottom opening of ice metering sleeve.

12. The ice storage bin according to claim 11, further comprising a curved surface formed on the elongated body member and adjacent to said interior channel, said curved surface is angled toward said exterior channel away from an interior surface of said elongated body member, thereby allowing condensation from said elongated body member to traverse said interior surface of said elongated body member into said interior channel while keeping ice cubes out of the interior channel.

13. The ice storage bin according to claim 11, further comprising a drain port in fluid communication with said exterior and interior channels, whereby condensate collected by said exterior and interior channels exits said ice storage bin via said drain port.

14. The ice storage bin according to claim 1, wherein said ice metering sleeve is at least one selected from the group consisting of: (i) a double-wall construction with an insulation layer disposed within said double-wall, (ii) a single or double-wall construction with a layer of insulating material disposed on either or both of an interior surface or exterior surface of said ice metering sleeve, and (iii) said ice metering sleeve formed of a sufficiently low, thermally conductive insulating material which substantially prevents condensation or melting about said interior or exterior surface of said ice metering sleeve.

15. The ice storage bin according to claim 14, wherein said insulation layer is at least one selected from the group consisting of: gas, air and foam.

16. The ice storage bin according to claim 1, wherein said ice collection container is a bucket or a liner disposed in a bucket with a false bottom.

17. A method for discharging a metered amount of ice from an ice storage bin, said method comprising: actuating an ice metering sleeve which is movably disposed within an ice storage compartment, wherein said ice metering sleeve is moved between a closed position and an open position, said ice metering sleeve having a top opening and a bottom opening, such that said ice, which is disposed within said ice storage compartment, traverses said ice metering sleeve from said top opening to said bottom opening; discharging a metered amount of ice from the bottom opening of said ice metering sleeve via a discharge port disposed proximate to a bottom portion of said ice storage compartment wherein metered amount comprises a first amount of ice sufficient to fill ice collection container to the level of the bottom of metering sleeve; moving the ice metering sleeve to the closed position thereby causing a second metered amount of ice equivalent to the amount of ice that is contained in the ice metering sleeve to fall into the ice collection container; and collecting the discharged ice in an ice collection container.

18. The method according to claim 17, wherein the actuating of said ice metering sleeve is provided by either (1) a handle and a pair of oppositely disposed slide devices or (2) motor, whereby the metering sleeve moves in reciprocal vertical movement between the closed and open positions.

19. The method according to claim 17, wherein said ice metering sleeve comprises an elongated body member disposed between said top opening and said bottom opening.

20. The method according to claim 19, further comprising a drip catcher device which is formed proximate to said bottom opening of said ice metering sleeve, wherein said drip catcher device comprises an exterior channel and an interior channel.

21. The method according to claim 20, further comprising a curved surface formed on the elongated body member and adjacent to said interior channel, said curved surface is angled toward said exterior channel away from an interior surface of said elongated body member, thereby allowing condensation from said elongated body member to traverse said interior surface of said elongated body member into said interior channel while keeping ice cubes out of the interior channel.

22. The method according to claim 20, further comprising a drain port in fluid communication with said exterior and interior channels, whereby condensate collected by said exterior and interior channels exits said ice storage bin via said drain port.

23. The method according to claim 17, wherein said ice collection container is a bucket or a liner disposed in a bucket with a false bottom.

24. The method according to claim 17, further comprising the steps of: returning said ice metering sleeve to a closed position after the discharging step; and catching said ice metering sleeve to that it does not return to the opened position.

25. The method according to claim 17, further comprising the step of locking said ice metering sleeve when in the closed position so that it does not return to the opened position when said ice collection container has been removed from the ice storage bin after the discharge step.

* * * * *